No. 644,259. Patented Feb. 27, 1900.
O. P. OSTERGREN.
RECEPTACLE FOR HOLDING AND STORING LIQUID AIR OR OTHER LIQUID GASES.
(Application filed May 1, 1899.)
(No Model.)
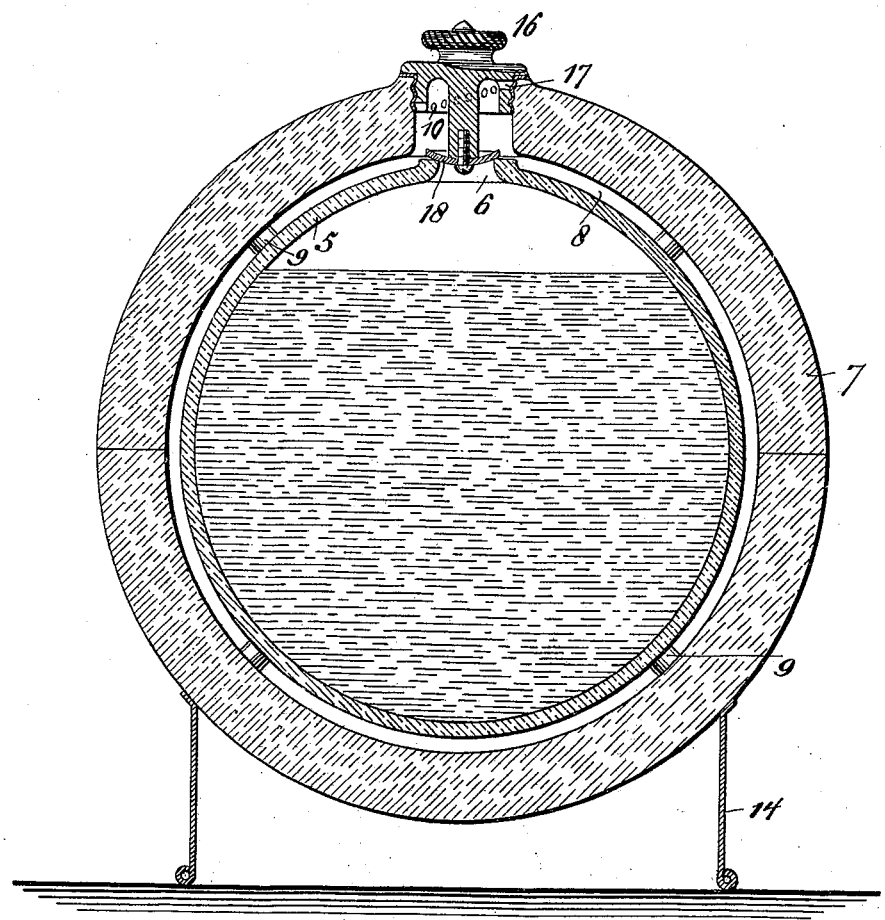
Fig. 1,
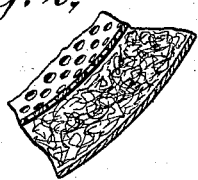
Fig. 2,
WITNESSES:
D. H. Hayward
C. F. Carrington.
INVENTOR
Oscar Patric Ostergren
BY
James C. Chapin
His ATTORNEY
THE NORRIS PETERS CO., PHOTO-LITHO., WASHINGTON, D. C.

UNITED STATES PATENT OFFICE.

OSCAR PATRIC OSTERGREN, OF NEW YORK, N. Y.

RECEPTACLE FOR HOLDING AND STORING LIQUID AIR OR OTHER LIQUID GASES.

SPECIFICATION forming part of Letters Patent No. 644,259, dated February 27, 1900.

Application filed May 1, 1899. Serial No. 715,156. (No model.)

*To all whom it may concern:*

Be it known that I, OSCAR PATRIC OSTERGREN, a citizen of the United States of America, and a resident of New York, (Brooklyn,) Kings county, State of New York, have invented certain new and useful Improvements in Receptacles for Holding and Storing Liquid Air or other Liquid Gases, of which the following is a specification.

My invention relates to receptacles for holding and storing liquid air or other liquefied gases; and to this end it consists in a vessel duly insulated and protected from the external or latent heat of the atmosphere.

The receptacle embodying my invention comprises an interior vessel arranged to hold the liquid and an exterior casing of porous material of such size and shape that a space shall be left between it and the interior vessel. An opening in the interior vessel communicates with this space and is preferably provided with a non-return or check valve. The outer porous casing is itself provided with a discharge-orifice, to which is fitted a valve or plug.

The object of my invention is to preserve and store liquefied air or other gases by utilizing some of its own products of evaporation to surround the vessel containing the liquid, and thereby to insulate the same from the latent heat of the atmosphere.

I will now proceed to describe a receptacle embodying my invention, and will then point out the novel features in the claims.

Figure 1 is a central vertical section of a receptacle embodying my invention. Fig. 2 is a detail sectional view of one form of porous casing which may be employed.

Reference character 5 designates a vessel adapted to receive the liquid to be stored. It is preferably of globular form, though it may be of any desired shape, as convenient. This vessel I prefer to make of glass or of copper. It may of course be of any other suitable material. It is provided at or near its upper end with an orifice 6, through which it may be filled and emptied, and also through which products of evaporation may pass, for a purpose to be hereinafter explained.

7 designates a hollow casing conforming in shape to the interior vessel 5, which it is adapted to surround. Its interior diameter, however, is slightly greater than the exterior diameter of the hollow vessel 5. A hollow space 8 is thus left between them.

The vessel 5 is preferably supported within the casing 7 by spacing-pieces 9. The said casing 7 is made of some porous material, such as porous carbon, pressed cork, or the like. It is made in two parts in order that the vessel 5 may be placed in position therein and is provided with a suitable stand or support 14. The upper portion of the casing has an opening or orifice 10, to which is fitted a screw-valve plug 16. The valve-plug is provided with a series of discharge-ports 17, arranged on different levels, which ports will afford communication from the outside atmosphere to the interior of the vessel in proportion as the valve-plug is raised or lowered. The opening 10 is preferably arranged opposite the opening 6 in the interior vessel 5.

18 is a valve or closure of flexible material, preferably leather, secured to the lower end of the stem of the plug 16 and adapted, when said plug is screwed down, to rest upon and close the orifice 6 against the passage of currents of fluid in one direction, thus acting as a check-valve. When, however, the plug 16 is raised as by unscrewing same, the valve 18 is raised with it and rendered inoperative—that is to say, the orifice 6 is left clear for the passage of fluid in either direction.

The operation of the device is as follows: It being desired to fill the vessel, the screw-plug 16 is removed and the liquefied air or other gas which it may be desired to store is poured through the opening 10 and orifice 6 into the vessel 5. The screw-plug is then returned to its place and screwed down home. The heat of the vessel will cause a certain amount of the liquefied air to evaporate, which vapor will pass upward through the orifice 6, lifting the valve-leather 18, and will fill the hollow space 8. The intensely-cold products of evaporation will then attempt to force their way through the porous casing, and, in fact, will gradually do so, repelling the warm atmospheric air on the exterior of the casing, and thus effectively insulating the interior vessel from the latent heat of the atmosphere.

When it is desired to utilize the liquid air for such purposes as refrigeration, it is only necessary to partially unscrew the plug 16, and, in accordance with the number of discharge-ports uncovered, so will more or less air be discharged.

Should it be desired to discharge a still greater quantity at a time, the plug may be entirely removed, in which case the warm atmospheric air entering through the opening will supply sufficient heat to cause the required evaporation.

In Fig. 2 I have shown another form of porous casing which I may employ, in which two perforated vessels, one within the other, are provided and the space between them filled up with sawdust, excelsior, or the like. The perforated vessels might be of wire mesh. In fact, there are many forms in which the said porous casing might be made, and I do not wish to limit myself to any particular form or material.

What I claim is—

1. In a receptacle for holding liquid air or other liquids vaporizable at atmospheric temperatures and pressure, the combination of an interior vessel for holding the liquid, with an exterior porous casing surrounding same, a space being arranged between the interior vessel and the porous casing, and an orifice in the interior of the vessel opening into said space, the exterior of the said porous casing being exposed to the atmosphere, substantially as specified.

2. In a receptacle for holding liquid air or other liquids vaporizable at atmospheric temperatures and pressure, the combination of an interior vessel for holding the liquid, with an exterior porous casing surrounding same, a space being arranged between the interior vessel and the porous casing, an orifice in the interior vessel opening into said space, the exterior of the said porous casing being exposed to the atmosphere, and a non-return valve fitted to said opening, whereby fluid is permitted normally to pass in one direction only, substantially as specified.

3. In a receptacle for holding liquids, the combination of an interior vessel for holding the liquid, with an exterior porous casing surrounding same, a space being arranged between the interior vessel and the porous casing, an orifice in the interior vessel opening into said space, and a non-return valve fitted to said opening whereby fluid is permitted normally to pass in one direction only, an opening in said porous casing, a valve fitted thereto, a connection between said valve and said non-return valve whereby when the former is opened the latter is rendered inoperative, thereby permitting the passage of fluid in either direction, substantially as specified.

Signed by me at New York this 29th day of April, 1899.

OSCAR PATRIC OSTERGREN.

Witnesses:
SAMUEL MAJOR GARDENLINE,
RITA BRADT.